United States Patent
Jeong et al.

(10) Patent No.: US 7,436,825 B2
(45) Date of Patent: Oct. 14, 2008

(54) METHOD AND APPARATUS FOR DISTINGUISHING BETWEEN SERVICES OF ALL FREQUENCY BANDS AND SPECIFIC FREQUENCY BAND

(75) Inventors: Kyeong-In Jeong, Suwon-si (KR); Kook-Heui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 11/199,286

(22) Filed: Aug. 9, 2005

(65) Prior Publication Data

US 2006/0029066 A1    Feb. 9, 2006

(30) Foreign Application Priority Data

Aug. 9, 2004    (KR) .................. 10-2004-0062545

(51) Int. Cl.
*H04L 12/56* (2006.01)

(52) U.S. Cl. .................. 370/386; 370/328; 370/270; 455/414.1; 455/412.2

(58) Field of Classification Search ............ 370/389, 370/338, 352, 328, 437, 342, 508; 455/414.1, 455/435, 426, 437, 552
See application file for complete search history.

(56) References Cited

U.S. PATENT DOCUMENTS

| | | | |
|---|---|---|---|
| 6,236,646 B1 * | 5/2001 | Beming et al. ............ | 370/335 |
| 6,449,491 B1 * | 9/2002 | Dailey ..................... | 455/518 |
| 6,546,250 B1 * | 4/2003 | Turcotte et al. .......... | 455/437 |
| 2002/0027994 A1 * | 3/2002 | Katayama et al. ....... | 380/269 |
| 2003/0040314 A1 * | 2/2003 | Hogan et al. ............ | 455/435 |
| 2003/0207696 A1 * | 11/2003 | Willenegger et al. ..... | 455/522 |
| 2004/0032865 A1 * | 2/2004 | Kwon ..................... | 370/367 |
| 2004/0105400 A1 * | 6/2004 | Jean ...................... | 370/311 |
| 2004/0240401 A1 * | 12/2004 | Willenegger et al. ..... | 370/294 |
| 2005/0201343 A1 * | 9/2005 | Sivalingham et al. .... | 370/338 |

(Continued)

FOREIGN PATENT DOCUMENTS

EP    0 476 826 A2    8/1991

(Continued)

OTHER PUBLICATIONS

3GPP TSG-RAN WG2 Meeting #46 25.331 CR 2448' Online! Apr. 4, 2005-Apr. 8, 2005 pp. 1-19, XP002352855, Beijing, P.R. China Retrieved from the Internet: URL: http://www.3gpp.org/ftp/tsg_ran/TSG_RAN/TSGR_28/Docs/PDF/RP-050316.pdf' retrieved on Apr. 11, 2005.

(Continued)

*Primary Examiner*—Tan Trinh
(74) *Attorney, Agent, or Firm*—Roylance, Abrams, Berdo & Goodman, LLP

(57) ABSTRACT

Disclosed is an apparatus and method for transmitting information for distinguishing between a packet data service in all of a plurality of frequency bands and a packet data service of a specific frequency band from a Radio Network Controller (RNC) to a User Equipment (UE) in a mobile communication system providing a plurality of packet data services through a plurality of frequency bands, the method including the steps of starting a packet data service which the UE has joined, and transmitting indicator information to said all frequency bands, the indicator information indicating if the packet data service can be provided in said all frequency bands.

30 Claims, 4 Drawing Sheets

U.S. PATENT DOCUMENTS

| | | | |
|---|---|---|---|
| 2006/0019641 A1* | 1/2006 | Vayanos et al. | 455/414.1 |
| 2006/0156370 A1* | 7/2006 | Parantainen | 725/132 |
| 2006/0268873 A1* | 11/2006 | Tonjes et al. | 370/392 |

FOREIGN PATENT DOCUMENTS

| | | |
|---|---|---|
| EP | 0476826 | 3/1992 |
| WO | WO 99/14874 | 3/1999 |
| WO | WO 01/22632 | 3/2001 |
| WO | WO 01/22632 A1 | 3/2001 |
| WO | WO 03/096149 | 11/2003 |
| WO | WO 03/096149 A2 | 11/2003 |

OTHER PUBLICATIONS

3GPP TSG-RAN WG2: "25.331 CR 2548" Apr. 4, 2005-Apr. 8, 2005; pp. 1-19.

* cited by examiner

METHOD AND APPARATUS FOR DISTINGUISHING BETWEEN SERVICES OF ALL FREQUENCY BANDS AND SPECIFIC FREQUENCY BAND

PRIORITY

This application claims to the benefit under 35 U.S.C. §119(a) of an application entitled "Method And Apparatus For Distinguishing Between Services Of All Frequency Bands And Specific Frequency Band" filed in the Korean Industrial Property Office on Aug. 9, 2004 and assigned Serial No. 2004-62545, the entire contents of which are hereby incorporated by reference.

BACKGROUND OF THE INVENTION

1. Field of the Invention

The present invention relates to a mobile communication system. More particularly, the present invention relates to a method and an apparatus by which a User Equipment (UE) can identify a service for a certain frequency layer.

2. Description of the Related Art

The recent rapid development of the mobile telecommunication system has enabled the rapid increase in the quantity of data provided through the mobile telecommunication system, which has thereby induced the development of the third generation (3G) mobile communication system for transmitting data at a higher speed or data rate. For the 3G mobile communication system, European countries have employed a Wideband Code Division Multiple Access (WCDMA) scheme, which is an asynchronous scheme between base stations, and North American countries have employed a Code Division Multiple Access (CDMA) scheme, which is a synchronous scheme between base stations, respectively, as a wireless access standard.

In such a mobile communication system, a plurality of users simultaneously share a wide frequency band. Specifically, a transmitter simultaneously transmits a signal converted over a wideband by using a spread spectrum scheme to users and a receiver detects a corresponding signal for each user by using a corresponding code or sequence. The CDMA scheme has better security than the other multiple access schemes have because the transmitted data is not easily divulged in the CDMA scheme.

The mobile communication system supports a broadcast/multicast service in which one data source provides the same data stream to a plurality of UEs. The broadcast/multicast service comprises a cell broadcast service for mainly providing messages and a Multimedia Broadcast/Multicast Service (MBMS) for providing real time images and voice, still image and text in the type of multimedia.

When multiple MBMSs are overlapping frequency bands within the same area, a UE must perform a service selection process in order to benefit from one of the MBMSs.

Hereinafter, reference will be made to FIG. 1 illustrating an example of a cell layer structure comprises cell frequencies overlapping in one service area.

In the cell structure illustrated in FIG. 1, different cell frequencies including frequency #1 (f1) 104, frequency #2 (f2) 103, frequency #3 (f3) 102 and frequency #4 (f4) 101 overlap in one service area. The UE 111 joins both service A and service B. Service A is a service that can be provided in all frequencies, and service B is a service that can be provided in only frequency #4 (f4) 101. The service B may be an MBMS and can be provided only in a particular frequency for efficient use of radio resources and due to the characteristics of the service.

If service B starts while the UE receives service A, the system transmits a message instructing a frequency change (which implies cell change) through frequency #4 (f4) 101 because service B can be provided in only frequency #4 101. The frequency change message preferably comprises a service identifier (ID), changeable frequency (or cell information), and the like. Then, the UE 111 in frequency #2 (f2) 103 performs a service selection because it cannot simultaneously receive both service A and service B. The service selection may be a service selection in a Non Access Stratum (NAS) level through interconnection with NAS or a selection based on priorities of services in Access Stratum (AS).

For example, when the UE performs service selection, if service A has a higher priority than service B, the UE does not move to frequency #4 (f4) 101. Then, the UE cannot simultaneously receive both service A nor service B in the current frequency #2 (f2) 103. That is, the UE can receive only service A and cannot receive service B. As a result of the service selection, if service A is selected, the UE stays in the current frequency #2 (f2) 103 and continuously receives service A while giving up service B.

According to the method as described above in which the UE maintains the current frequency through the unnecessary service selection, the UE must abandon some service (service B in the example) in spite of the availability of all joined services (service A and service B).

SUMMARY OF THE INVENTION

Accordingly, the present invention has been made to solve the above-mentioned problems occurring in the prior art and provides a method and an apparatus, by which a UE can distinguish a service provided in all frequencies overlapping in the same area from a service provided in only one predetermined frequency.

Also, the present invention provides a method and an apparatus, by which a UE can efficiently select a frequency when the UE can receive multiple services, so that the UE can simultaneously use the provided multiple services.

In order to accomplish this object, there is provided a method for transmitting information for distinguishing between a packet data service of all frequency bands and a packet data service of a specific frequency band from a Radio Network Controller (RNC) to a User Equipment (UE) in a mobile communication system providing a plurality of packet data services through a plurality of frequency bands, the method comprising the steps of starting a packet data service, which the UE has joined; and transmitting indicator information to all of said plurality of frequency bands, the indicator information indicating if the packet data service can be provided on all of said plurality of frequency bands.

In accordance with another aspect of the present invention, there is provided a method for receiving information for distinguishing between a packet data service of all on a plurality of frequency bands and a packet data service of a specific frequency band by a User Equipment (UE) in a mobile communication system providing a plurality of packet data services through a plurality of frequency bands, the method comprising the steps of receiving indicator information which represents that a corresponding packet data service can be provided on all of said plurality of frequency bands for each of at least one packet data service which the UE has joined; when movement of the UE from a first frequency band receiving location in which the UE is currently located to a second frequency band in which a first packet data service can be provided is requested, determining if at least one second packet data service which is due to be serviced or currently being serviced in the first frequency band exists; when at least one second packet data service which is due to be serviced or currently being serviced in the first frequency band exists, determining with reference to the indicator information if all of said at least one second packet data service can be provided on all of said plurality of frequency bands; and when all of said at least one second packet data service cannot be provided in said all frequency bands, performing service selection based on priorities for the first packet data service and the second packet data service which cannot be provided on all of said plurality of frequency bands.

In accordance with another aspect of the present invention, there is provided an apparatus for distinguishing between a packet data service of all frequency bands and a packet data service of a specific frequency band in a mobile communication system providing a plurality of packet data services through a plurality of frequency bands, the apparatus comprising a Radio Network Controller (RNC) for transmitting indicator information representing that a packet data service can be provided in all frequency bands on all of said plurality of frequency bands, the indicator information; and a User Equipment for determining if at least one second packet data service which is due to be serviced or currently being serviced in a first frequency band exists when movement of the UE from the first frequency band in which the UE is currently located to a second frequency band in that a first packet data service can be provided is requested, determining with reference to the indicator information if all of said at least one second packet data service can be provided on all of said plurality of frequency bands when at least one second packet data service which is due to be serviced or currently being serviced in the first frequency band exists, and performing service selection based on priorities for the first packet data service and the second packet data service which cannot be provided on all of said plurality of frequency bands when all of said at least one second packet data service cannot be provided on all of said plurality of frequency bands.

BRIEF DESCRIPTION OF THE DRAWINGS

The above and other objects, features and advantages of the present invention will be more apparent from the following detailed description taken in conjunction with the accompanying drawings, in which.

It should be understood that throughout the drawings like reference numbers refer to like features, structures and elements.

DETAILED DESCRIPTION OF EXEMPLARY EMBODIMENTS

Hereinafter, exemplary embodiments of the present invention will be described with reference to the accompanying drawings. In the following description, a detailed description of known functions and configurations incorporated herein will be omitted when it may make the subject matter of the present invention rather unclear.

Figure 1:
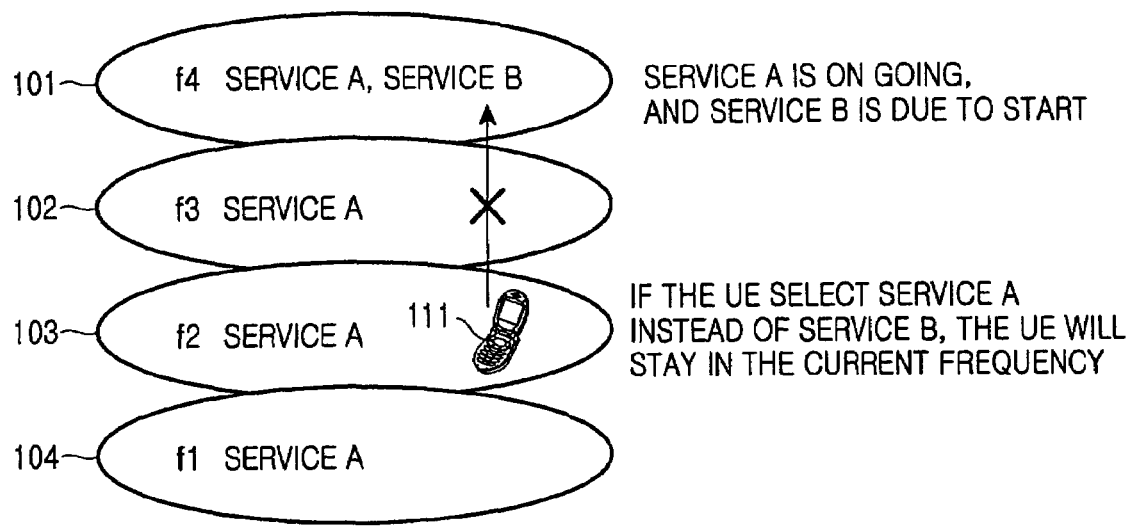
FIG. 1 illustrates one example of a cell layer structure having cell frequencies overlapping in one service area.
Figure 2:
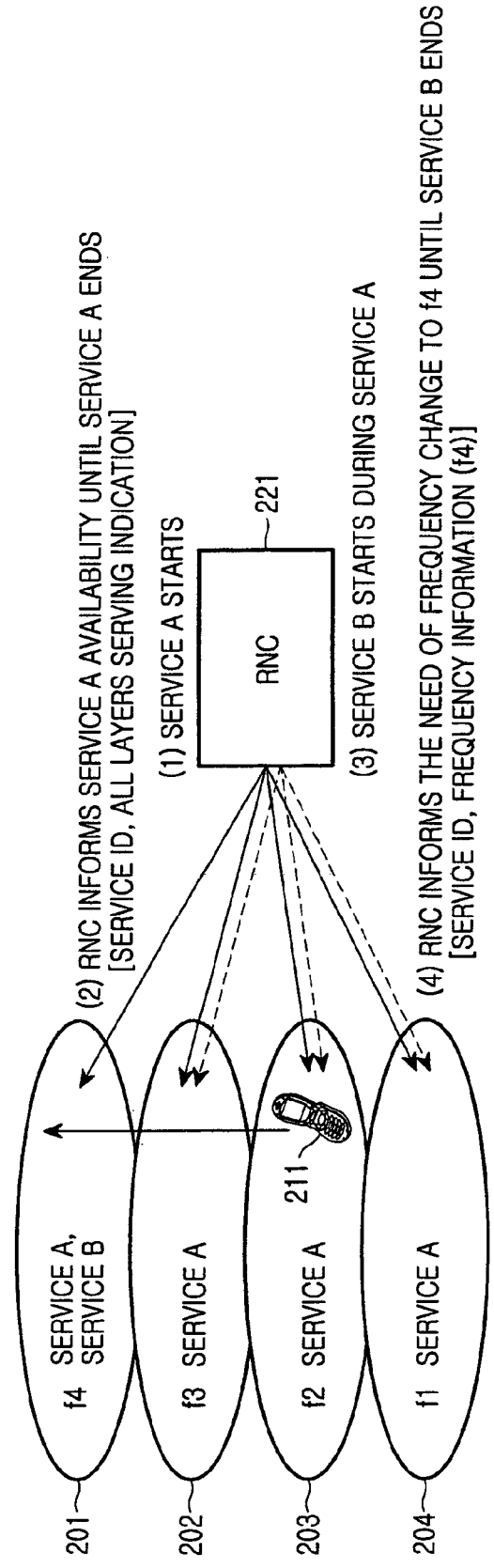
FIG. 2 illustrates a method according to an embodiment of the present invention, by which a UE can distinguish a service provided in all frequencies from a service provided in only one predetermined frequency.

FIG. 2 illustrates a method according to an embodiment of the present invention, by which a UE can distinguish a service provided in all frequencies from a service provided in only one predetermined frequency.

In the cell structure shown in FIG. 2, frequency #4 (f4) 201, frequency #3 (f3) 202, frequency #2 (f2) 203 and frequency #1 (f1) 204 overlap in one service area, and a UE 211 joins both service A and service B. Service A is provided in all frequencies and service B is provided in only frequency #4 201. Further, a Radio Network Controller (RNC) 221 controls radio resources of the service areas.

In step (1), service A starts. Then, in step (2), the RNC 221 transmits availability information of service A through a control channel for service A. Because service A is provided in all frequencies, the availability information of service A is periodically transmitted to all frequency bands until service A ends in order to support the mobility of the UE.

If service A is, for example, an MBMS of the 3GPP, an MBMS Service Information (SI) message including the ID of service A is transmitted through an MBMS Control Channel (MCCH), which is a common channel from the start of the session belonging to service A up to the end of the session. The MBMS SI message is a message for informing the service availability within a cell to the UE.

The service availability information of service A, which is periodically transmitted through the control channel for service A in step (2), includes not only the service ID but also an indicator for indicating if service A is provided in all frequencies. In the present embodiment, because service A is provided in all frequencies, a value of the indicator is set as 'true'. By the indicator, the UE 211 can recognize that service A is provided in all frequencies.

In step (3), service B starts before service A ends. In step (4), the RNC 221 transmits an indicator message for indicating that it is necessary to perform frequency change to frequency #4 (f4) 201 from frequency #1 (f1) 204, frequency #2 (f2) 203 or frequency #3 (f3) 202 in order to receive service B, because service B is provided in only frequency #4 201. The indicator message in step (4) is transmitted through the control channel for service B and includes a service ID and target frequency information (or cell information). The indicator message in step (4) is transmitted periodically and continuously until service B ends, in order to support the mobility of the UE.

When the UE 211 receives the indicator message of step (4), the UE performs, in step (5), frequency change to frequency #4 (f4) 201 without performing the service selection in order to receive service B, because the UE has already got the availability information in step (2) which informs that service A is provided in all frequencies. In frequency #4 (f4) 201, the UE can receive both service A and service B.

FIG. 2 illustrates a method according to an embodiment of the present invention, by which a UE can distinguish a service provided in all frequencies, comprising a plurality of frequency layers, from a service provided in only one predetermined frequency.

According to another embodiment of the present invention, an identifier may be used in order to indicate a service using a current frequency as a specific frequency from among services provided in the current frequency. In other words, when service availability information transmitted through a control channel for a specific service includes no identifier which indicates a service using a current frequency as a specific frequency, the UE infers that the specific service is provided in all frequencies.

Figure 3:
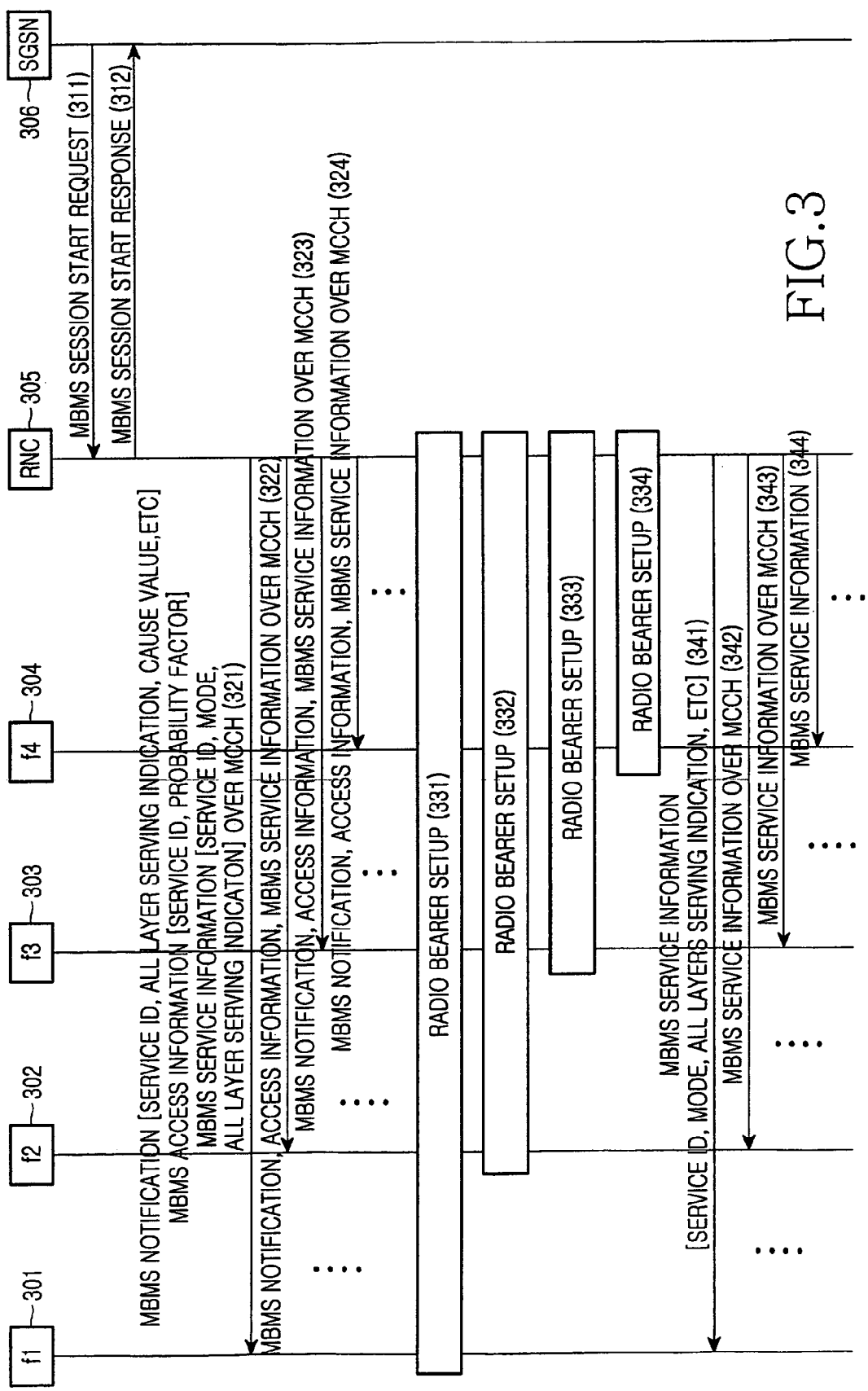
FIG. 3 is a flow diagram of a control signal according to an embodiment of the present invention.

FIG. 3 is a flow diagram of a control signal according to an embodiment of the present invention in the case where the embodiment of FIG. 2 is applied to an MBMS.

In the present embodiment, frequency #1 (f1) 204, frequency #2 (f2) 203, frequency #3 (f3) 202 and frequency #4 (f4) 201 overlap in the same service area, an RNC 305 controls the service area, and a Serving GPRS Support Node (SGSN) 306 controls the RNC 305. In step 311, the RNC 305 receives a session start request message from the SGSN 306. The session start request message indicates that a session of a specific MBMS service X is due to start. The session start request message includes a service ID and Quality of Service (QoS) information for service X. In step 312, the RNC 305 transmits a response message to the SGSN 306 in response to the session start request message of step 311.

In steps 321 through 324, each of the cells providing the frequencies for the MBMS Service X transmits an MBMS notification message notifying that the session of service X is due to start to UEs which want to join and receive the specific service X, an MBMS access information message requiring Radio Resource Control (RRC) connection setup to UEs in an idle mode in order to count the number of UEs which want to receive service X, and an MBMS service information message carrying service availability information of a current cell.

The MBMS notification message, which is a message for notifying a change in the control information transmitted through an MCCH according to the occurrence of an event for service X, includes a service ID, a cause value, all layer serving indication information and the like. The cause value includes a session start, a session stop and a radio bearer reconstruction and is set as the session start in FIG. 3. The all layer serving indication information notifies that service X is provided in all frequencies. The UE can understand by the serving indication information that service X is provided in all frequencies.

The MBMS access information message is a message requesting RRC connection setup to UEs in the idle mode in order to count the number of UEs that want to join and receive the specific service X in the cell corresponding to each of the frequencies. By counting the number of UEs that want to join and receive the specific service X, the RNC can determine whether to provide the service X through a common channel or a dedicated channel according to the number of UEs wanting to join in order to secure efficient use of radio resources. The transfer mode using the common channel is called Point to Multipoint (PTM) mode and the transfer mode using the common channel is called Point to Point (PTP) mode.

The MBMS access information message is not always transmitted but is transmitted only when the RNC fails to keep a sufficient number of UEs of the RRC connected mode which want to receive service X in the corresponding cell. FIG. 3 illustrates the operation when it is necessary to count the number of UEs in all cells. The MBMS access information message preferably includes a service ID and a probability factor for preventing a large number of UEs in the idle mode from simultaneously requesting the RRC connection.

The MBMS service information message preferably includes a service list available in each cell. The MBMS service list includes services, the session of which is due to start or is going on in the current cell. By the message, the UE can determine if the service which the UE has joined or wants to receive is available in the current cell. The MBMS service list includes a service ID, a transfer mode and 'all frequency serving indication information'. The transfer mode represents PTM or PTP mode. The 'all frequency serving indication information' notifies the UE that the service is provided in all frequencies, thereby notifying if the service which is due to start its session is provided in all frequencies. The MBMS service information message is periodically transmitted in order to support the mobility of the UE as the user travels within the areas serviced by the mobile communication system.

The transfer mode information may be either excluded when a radio bearer for the service X has not been set up yet or included in order to clearly notify that it is before the radio bearer is set up.

Steps 331 through 334 are steps for setting radio bearers for service X in each cell. In steps 331 through 334, the MBMS service information is transmitted to each cell. The MBMS service information message includes a service list available in the current cell, includes a service ID, a transfer mode and 'all frequency serving indication information', and is periodically transmitted until the session of service X ends. When the session of service X has ended, the information corresponding to service X is deleted from the service list.

By checking the 'all frequency serving indication information' included in the MBMS service information message, the UE can recognize that the service X which the UE wants to receive is provided in all frequencies. If the UE has joined multiple services and needs to perform service selection, the UE can perform efficient service selection by using the 'all frequency serving indication information'. For example, when the UE is currently receiving service X and another service Y which the UE joined has started, if the starting service Y can be provided in another specific frequency instead of the current frequency and the on-going service X can be provided in all frequencies, the UE can move to the another specific frequency for service Y without performing the service selection. Then, the UE can receive all the joined services including both service X and service Y, which can be any variety of services provided by a mobile communication service provider.

Another embodiment has the same basic principle as that of the embodiment shown in FIG. 3. As another embodiment, a service which is not provided in all frequencies may be reported instead of reporting the service which is provided in all frequencies as in FIG. 3. That is, the transmission of information by which a UE can distinguish a service provided in all frequencies from a service provided in only one predetermined frequency.

Figure 4:
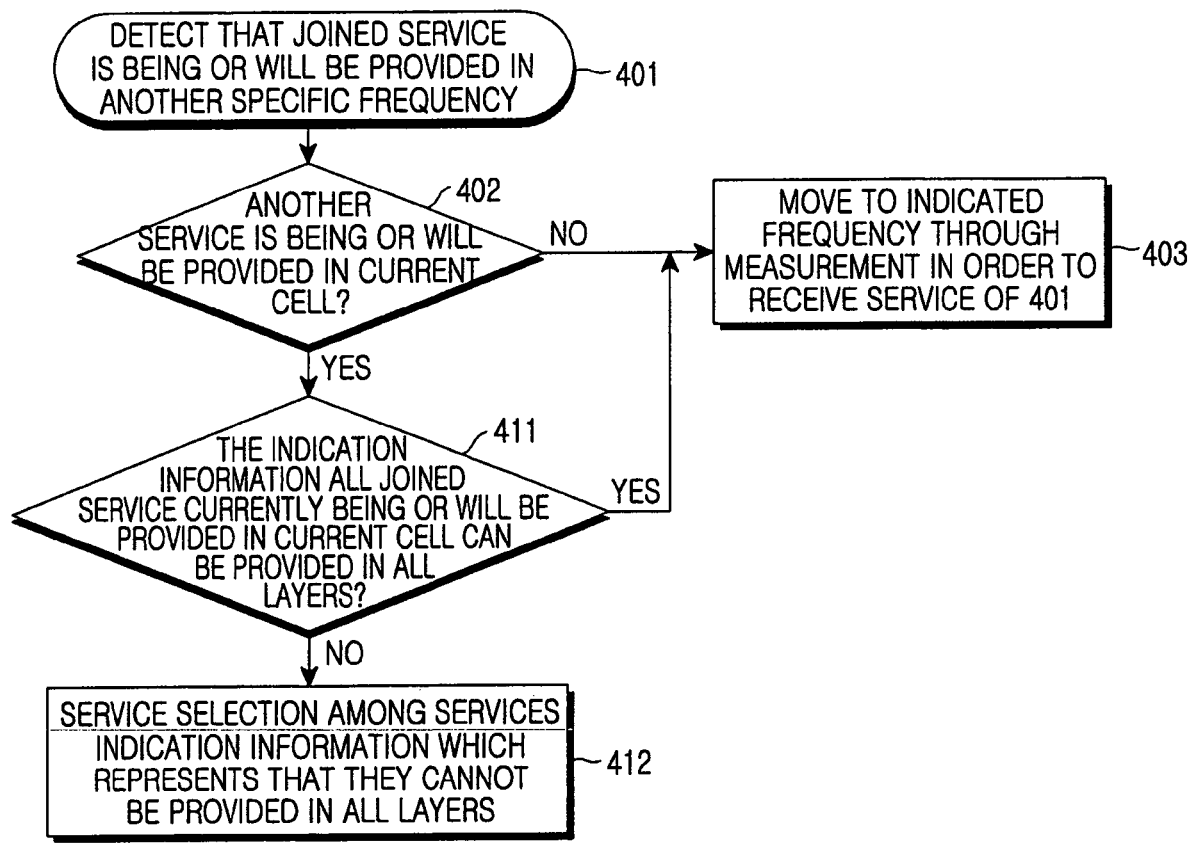
FIG. 4 is a flowchart illustrating an operation of a UE according to an embodiment of the present invention.

FIG. 4 is a flowchart illustrating an operation of a UE according to an embodiment of the present invention.

In step 401, the UE receives indication information which indicates to the UE to switch to a specific frequency providing service X, which the UE joined, and recognizes that service X is due to be provided or being provided in another specific frequency instead of the current frequency. Then, in step 402, the UE checks if another service Y, which the UE joined, is due to be or being provided in the current cell of the current frequency. In step 402, by checking the parameter, which the UE keeps or through the MBMS service information received in the current cell, the UE can recognize if another joined service Y is being provided. Also, through the MBMS service information or the MBMS notification message received in the current cell, the UE can recognize if the another joined service Y is due to be provided in the current cell. If the UE is not receiving service Y or service Y is not due to be provided in the current cell, the UE proceeds to step 403 in which the UE performs cell reselection through measurement of the frequency indicated by the indication information of step 401.

However, if the UE is receiving service Y or service Y is due to be provided in the current cell, the UE proceeds to step 411 in which the UE determines if each indication information for all joined services being provided or due to be provided includes information of availability in all layers, that is, if all joined services being provided or due to be provided can be provided in all frequency bands. If a joined service being provided or due to be provided can be provided in all frequency bands from the determination in step 411, the UE proceeds to step 403 in which the UE moves to the indicated specific frequency in order to receive service X.

However, if any of all of the joined services being provided or due to be provided cannot be provided in all frequency bands from the determination in step 411, the UE proceeds to step 412 in which the UE performs service selection. In the service selection, a service is selected only from services the indication information of which represents that they cannot be provided in all layers. That is, the service is selected from only the services which are provided in only one specific frequency or specific frequencies. The service selection can be performed by the UE either by itself according to the priorities of the services or by a user's instruction.

By the embodiments of the present invention, a UE can distinguish a service provided in all frequencies from a service provided in only one predetermined frequency, so that it can efficiently select a frequency when the UE can receive multiple services.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting a packet data service from a Radio Network Controller (RNC) to a User Equipment (UE) in a mobile communication system providing a plurality of packet data services through the plurality of frequency bands, the method comprising the steps of:

transmitting a plurality of packet data services wherein some of the plurality of packet data services are provided in all of a plurality of frequency bands and at least one of the plurality of packet data services are provided in a specific frequency band; and transmitting indicator information indicating that at least one of the packet data services can be provided in the specific frequency band.

2. The method as claimed in claim 1, wherein said packet data services are Multimedia Broadcast/Multicast Services (MBMSs).

3. The method as claimed in claim 1, wherein the indicator information is transmitted by an MBMS notification message notifying the UE that a session of the packet data services is due to start and an MBMS service information message indicating service availability information to the UE in a current cell.

4. The method as claimed in claim 1, further comprising the step of transmitting a service list representing at least one packet data service available in a corresponding frequency band to each of all of said plurality of frequency bands.

5. The method as claimed in claim 4, wherein the service list includes a service ID, a transfer mode and an indicator information for each packet data service available in a corresponding frequency band, a session of which is due to be or being provided, the indicator information representing if said each packet data service can be provided in the specific frequency bands.

6. The method as claimed in claim 1, further comprising the step of setting at least one radio bearer for an available service and periodically transmitting the service list in each of said plurality of frequency bands.

7. A method for receiving information for distinguishing between a packet data service provided in all of a plurality of frequency bands and a packet data service of a specific frequency band by a User Equipment (UE) in a mobile communication system providing a plurality of packet data services through the plurality of frequency bands, the method comprising the steps of:

receiving indicator information which indicates that a corresponding packet data service can be provided in all of the plurality of frequency bands for each of at least one packet data service that the UE has joined;

when movement of the UE from a first frequency band in which the UE is currently located to a second frequency band in which a first packet data service can be provided is requested, determining if at least one second packet data service, which is due to be serviced or currently being serviced in the first frequency band exists;

when at least one second packet data service, which is due to be serviced or currently being serviced in the first frequency band exists, determining with reference to the indicator information if all of said at least one second packet data service can be provided in all of said plurality of frequency bands; and when all of said at least one second packet data service cannot be provided in said all frequency bands, performing service selection based on priorities for the first packet data service and the second packet data service which cannot be provided in all of said plurality of frequency bands.

8. The method as claimed in claim 7, further comprising the step of, when all of said at least one second packet data service can be provided in all of said plurality of frequency bands, moving to the second frequency band in order to receive one of the first packet data service and said at least one second packet data service.

9. The method as claimed in claim 7, wherein said packet data services are Multimedia Broadcast/Multicast Services (MBMSs).

10. The method as claimed in claim 9, wherein the indicator information is transmitted by an MBMS notification message notifying that a session of the first packet data service is due to start and an MBMS service information message indicating service availability information in a current cell.

11. An apparatus for distinguishing between a packet data service in all of a plurality of frequency bands and a packet data service of a specific frequency band in a mobile communication system providing a plurality of packet data services through at least a plurality of all frequency bands, the apparatus comprising:

a Radio Network Controller (RNC) for transmitting indicator information indicating that a packet data service can be provided in all frequency bands of said plurality of frequency bands, the indicator information; and a User Equipment for determining if at least one second packet data service which is due to be serviced or currently being serviced in a first frequency band exists when movement of the UE from the first frequency band in which the UE is currently located to a second frequency band in which a first packet data service can be provided is requested, determining with reference to the indicator information if all of said at least one second packet data service can be provided in all of said plurality of frequency bands when at least one second packet data service which is due to be serviced or currently being serviced in the first frequency band exists, and performing service selection based on priorities for the first packet data service and the second packet data service which cannot be provided in all of said plurality of frequency bands when all of said at least one second packet data service cannot be provided in all of said plurality of frequency bands.

12. The apparatus as claimed in claim 11, wherein the UE switches to the second frequency band in order to receive one of the first packet data service and said at least one second packet data service, when all of said at least one second packet data service can be provided in all of said plurality of frequency bands.

13. The apparatus as claimed in claim 11, wherein said packet data services are Multimedia Broadcast/Multicast Services (MBMSs).

14. The apparatus as claimed in claim 11, wherein the indicator information is transmitted by an MBMS notification message notifying that a session of the first packet data service is due to start and an MBMS service information message indicating service availability information in a current cell.

15. The apparatus as claimed in claim 11, wherein the RNC transmits a service list representing at least one packet data service available in a corresponding frequency band to each of all of said plurality of frequency bands.

16. The apparatus as claimed in claim 15, wherein the service list includes a service ID, a transfer mode and an indicator information for each packet data service, a session of which is due to be or being provided, the indicator information indicating if said each packet data service can be provided in said all frequency bands.

17. The apparatus as claimed in claim 11, wherein the RNC sets at least one radio bearer for an available service and periodically transmits the service list in each of said frequency bands.

18. A method for transmitting a packet data service from a Radio Network Controller (RNC) to a User Equipment (UE) in a mobile communication system providing a plurality of packet data services through the plurality of frequency bands, the method comprising the steps of:
   transmitting a plurality of packet data services wherein some of the plurality of packet data services are provided in all of a plurality of frequency bands and at least one of the plurality of packet data services are provided in a specific frequency band; and
   transmitting indicator information indicating at least one packet data service that can be provided in the specific frequency bands;
   wherein the indicator information is transmitted by an MBMS notification message notifying the UE that a session of the packet data services is due to start and an MBMS service information message indicating service availability information to the UE in a current cell.

19. An apparatus for transmitting a packet data service from a Radio Network Controller (RNC) to a User Equipment (UE) in a mobile communication system providing a plurality of packet data services through a plurality of frequency bands, the apparatus comprising:
   means for transmitting the plurality of packet data services wherein some of the plurality of packet data services are provided in all of the plurality of frequency bands and at least one of the plurality of packet data services is provided in a specific frequency band; and
   means for transmitting indicator information indicating that at least one of the packet data services can be provided in the specific frequency band.

20. The method apparatus as claimed in claim 19, wherein the RNC transmits a service list representing at least one packet data service available in a corresponding frequency band to each of the plurality of frequency bands.

21. The apparatus as claimed in claim 20, wherein the service list includes a service ID, a transfer mode and indicator information for each packet data service, a session of which is due to be or being provided, the indicator information indicating if said packet data service can be provided in the specific frequency band.

22. The apparatus as claimed in claim 19, wherein the RNC sets at least one radio bearer for an available service and periodically transmits the service list in each of said frequency bands.

23. A method for receiving a packet data service by a User Equipment (UE) in a mobile communication system providing a plurality of packet data services through the plurality of frequency bands, the method comprising the steps of:
   receiving indicator information which indicates that a corresponding packet data service can be provided in a specific frequency band for at least one packet data service that the UE has joined; and
   if there is at least one frequency band indicated by the indicator information representing that a corresponding packet data service can be provided in a specific frequency band, selecting a frequency band in which the UE is located among the at least one frequency band when the UE joined multiple packet data services;
   wherein some of the plurality of packet data services are provided in all of a plurality of frequency bands and some of the plurality of packet data services are provided in specific frequency bands.

24. The method as claimed in claim 23, further comprising the step of, when none of said at least one packet data services have the indicator, selecting a frequency band among all of the frequency bands which the UE can locate.

25. The method as claimed in claim 23, wherein said packet data services are Multimedia Broadcast/Multicast Services (MBMSs).

26. The method as claimed in claim 25, wherein the indicator information is transmitted by an MBMS notification message notifying that a session of the packet data service is due to start and an MBMS service information message indicating service availability information in a current cell.

27. An apparatus for receiving a packet data service by a User Equipment (UE) in a mobile communication system providing a plurality of packet data services through the plurality of frequency bands, the apparatus comprising:
   means for receiving indicator information which indicates that a corresponding packet data service can be provided in a specific frequency band for at least one packet data service that the UE has joined; and
   means for selecting a frequency band to locate therein among at least one frequency band, if there is the at least one frequency band that is indicated by indicator information that a corresponding packet data service can be provided in a specific frequency band, when the UE joined multiple packet data services;
   wherein some of the plurality of packet data services are provided in all of a plurality of frequency bands and some of the plurality of packet data services are provided in specific frequency bands.

28. The apparatus as claimed in claim 27, wherein the UE switches to a frequency band among all of the frequency bands in which the UE can locate, when none of said at least one packet data service have the indicator.

29. The apparatus as claimed in claim 27, wherein said packet data services are Multimedia Broadcast/Multicast Services (MBMSs).

30. The apparatus as claimed in claim 27, wherein the indicator information is transmitted by an MBMS notification message notifying that a session of the packet data service is due to start and an MBMS service information message indicating service availability information in a current cell.

* * * * *